US012691324B2

(12) United States Patent (10) Patent No.: US 12,691,324 B2

Hazel (45) Date of Patent: Jul. 28, 2026

(54) ENERGY-GENERATING WORKOUT MAT

(71) Applicant: Wayne Hazel, Philadelphia, PA (US)

(72) Inventor: Wayne Hazel, Philadelphia, PA (US)

(*) Notice: Subject to any disclaimer, the term of this patent is extended or adjusted under 35 U.S.C. 154(b) by 41 days.

(21) Appl. No.: 18/988,051

(22) Filed: Dec. 19, 2024

(65) Prior Publication Data

US 2026/0175070 A1 Jun. 25, 2026

(51) Int. Cl.
*A63B 21/00* (2006.01)
*H02N 11/00* (2006.01)

(52) U.S. Cl.
CPC ....... *A63B 21/4037* (2015.10); *H02N 11/002* (2013.01)

(58) Field of Classification Search
CPC .... H02N 11/00; H02N 11/002; H02N 11/004; H02N 11/006; H02N 11/008; A63B 21/4037; A63B 6/00; A63B 6/02; A63B 6/025
See application file for complete search history.

(56) References Cited

U.S. PATENT DOCUMENTS

| | | | |
|---|---|---|---|
| 6,910,992 B2 | 6/2005 | Arguilez | |
| 8,013,457 B2 | 9/2011 | Bulthaup | |
| 8,888,660 B1 | 11/2014 | Oteman | |
| 9,067,099 B2 | 6/2015 | Beard | |
| 11,452,916 B1 * | 9/2022 | Kahn | A63B 24/0062 |

| | | | |
|---|---|---|---|
| 2012/0058861 A1 * | 3/2012 | Satut | A63B 24/0087 482/8 |
| 2014/0265334 A1 | 9/2014 | Reitman | |
| 2020/0155893 A1 * | 5/2020 | Manley | A63B 21/4037 |
| 2021/0106896 A1 * | 4/2021 | Fountaine | A63B 24/0062 |
| 2024/0123285 A1 * | 4/2024 | Hudak | A63B 24/0062 |

FOREIGN PATENT DOCUMENTS

WO WO2004082427 9/2004

OTHER PUBLICATIONS

Llarenas et al., Exercise Mat Utilizing Kinetic Energy from Humans' Footsteps to Generate Power, Published: Oct. 28, 2024 <URL: https://www.spiedigitallibrary.org/conference-proceedings-of-spie/ 13290/132900N/Design-fabrication-and-performance-evaluation-of- an-exercise-mat-utilizing/10.1117/12.3051018 > (Year: 2024).*
Thitima et al., Design of Kinetic-Energy Harvesting Floors, Published Oct. 15, 2020, <URL: Design of Kinetic-Energy Harvesting Floors | MDPI > (Year: 2020).*

* cited by examiner

*Primary Examiner* — Zachary T Moore

(57) ABSTRACT

An energy-generating workout mat includes a top layer and a bottom layer attached to the top layer. The top layer is made of flexible material. The top layer and the bottom layer are attached at respective perimeter portions such that the top layer and the bottom layer enclose an interior space. A plurality of microgenerators is positioned in the interior space between the top layer and the bottom layer. Each of the microgenerators is designed to be activated by a pressing force of a person exercising on the top layer to generate electrical energy. The microgenerators are coupled together by wiring. A battery is connected to the microgenerators by the wiring to receive and store the electrical energy.

15 Claims, 7 Drawing Sheets

ENERGY-GENERATING WORKOUT MAT

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to workout mats and more particularly pertains to a new energy-generating workout mat for generating power while a person works out on the mat. A plurality of microgenerators is located between layers of the mat and connected to a battery. The microgenerators take advantage of the movement of a person on the mat to generate electricity for storage in the battery, which stored power can then be used to power electronic devices and machinery.

(2) Description of Related Art Including Information Disclosed Under 37 CFR 1.97 and 1.98

The prior art relates to exercise equipment that can be used to generate energy, such as exercise bikes and weight-lifting machines. The prior art, as best understood, does not disclose an energy-generating workout mat that includes a plurality of microgenerators between a top layer and a bottom layer of the mat.

(h) BRIEF SUMMARY OF THE INVENTION

An embodiment of the disclosure meets the needs presented above in a energy-generating workout mat generally comprising a top layer and a bottom layer attached to the top layer. The top layer is made of flexible material. The top layer and the bottom layer are attached at respective perimeter portions such that the top layer and the bottom layer enclose an interior space. A plurality of microgenerators is positioned in the interior space between the top layer and the bottom layer. Each of the microgenerators is designed to be activated by a pressing force of a person exercising on the top layer to generate electrical energy. The microgenerators are coupled together by wiring. A battery is connected to the microgenerators by the wiring to receive and store the electrical energy.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
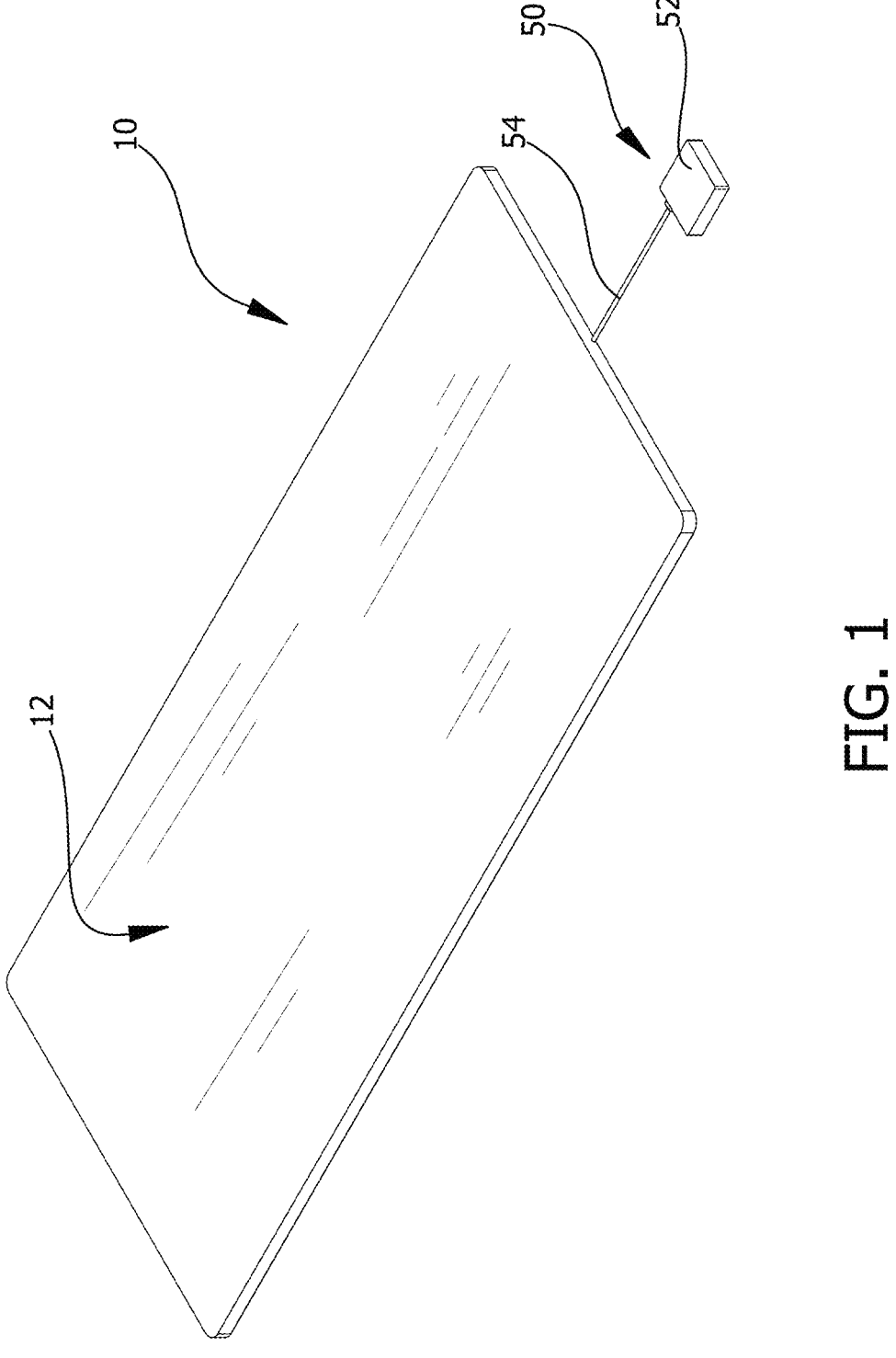
FIG. 1 is a top perspective view of an energy-generating workout mat according to an embodiment of the disclosure.

With reference now to the drawings, and in particular to FIGS. 1 through 7 thereof, a new energy-generating workout mat embodying the principles and concepts of an embodiment of the disclosure and generally designated by the reference numeral 10 will be described.

As best illustrated in FIGS. 1 through 7, the energy-generating workout mat 10 generally comprises a top layer 12 and a bottom layer 14 attached to the top layer 12. The top layer 12 is made of flexible material. The top layer 12 and the bottom layer 14 are attached at respective perimeter portions 16 such that the top layer 12 and the bottom layer 14 enclose an interior space 18. A plurality of microgenerators 20 is positioned in the interior space 18 between the top layer 12 and the bottom layer 14. Each of the microgenerators 20 is designed to be activated by a pressing force of a person 70 exercising on the top layer 12 to generate electrical energy. The microgenerators 20 are coupled together by wiring, which is not shown in any detail but is well known in the electrical arts. A battery 50 is connected to the microgenerators 20 by the wiring to receive and store the electrical energy.

The microgenerators 20 can be of different designs. In the exemplary embodiment shown in FIGS. 4 and 5, each of the microgenerators 20 includes a base 22, a head 24, and a generator assembly 26 positioned in the base 22. The head 24 is movably supported on the base 22 by a spring 28 and connected to the generator assembly 26. The head 24 is designed to engage and actuate the generator assembly 26 when the head 24 is depressed against the spring 28 by the pressing force of the person 70 on the top layer 12 and released. In the exemplary embodiment, the base 22 includes a bottom wall 30 and a perimeter wall 32 extending perpendicularly from the bottom wall 30. The perimeter wall 32 has an upper edge 34. The head 24 includes a top wall 36 and a perimeter wall 38 extending perpendicularly from the top wall 36. The head 24 includes a projection 40 designed to engage the generator assembly 26. The top wall 36 of the head 24 abuts the upper edge 34 of the perimeter wall 32 of the base 22 when the head 24 is depressed such that only the projection 40 contacts the generator assembly 26. The perimeter wall 38 of the head 24 has a larger diameter than the perimeter wall 32 of the base 22 such that the head 24 is movable with respect to the base 22 in a telescoping manner. In the exemplary embodiment, the projection 40 has a plurality of teeth 42 designed to engage a gear 44, which is connected by a pulley 46 to a drive 48. The rotary action of the drive 48 generates electricity to be stored in the battery 50.

Figure 2:
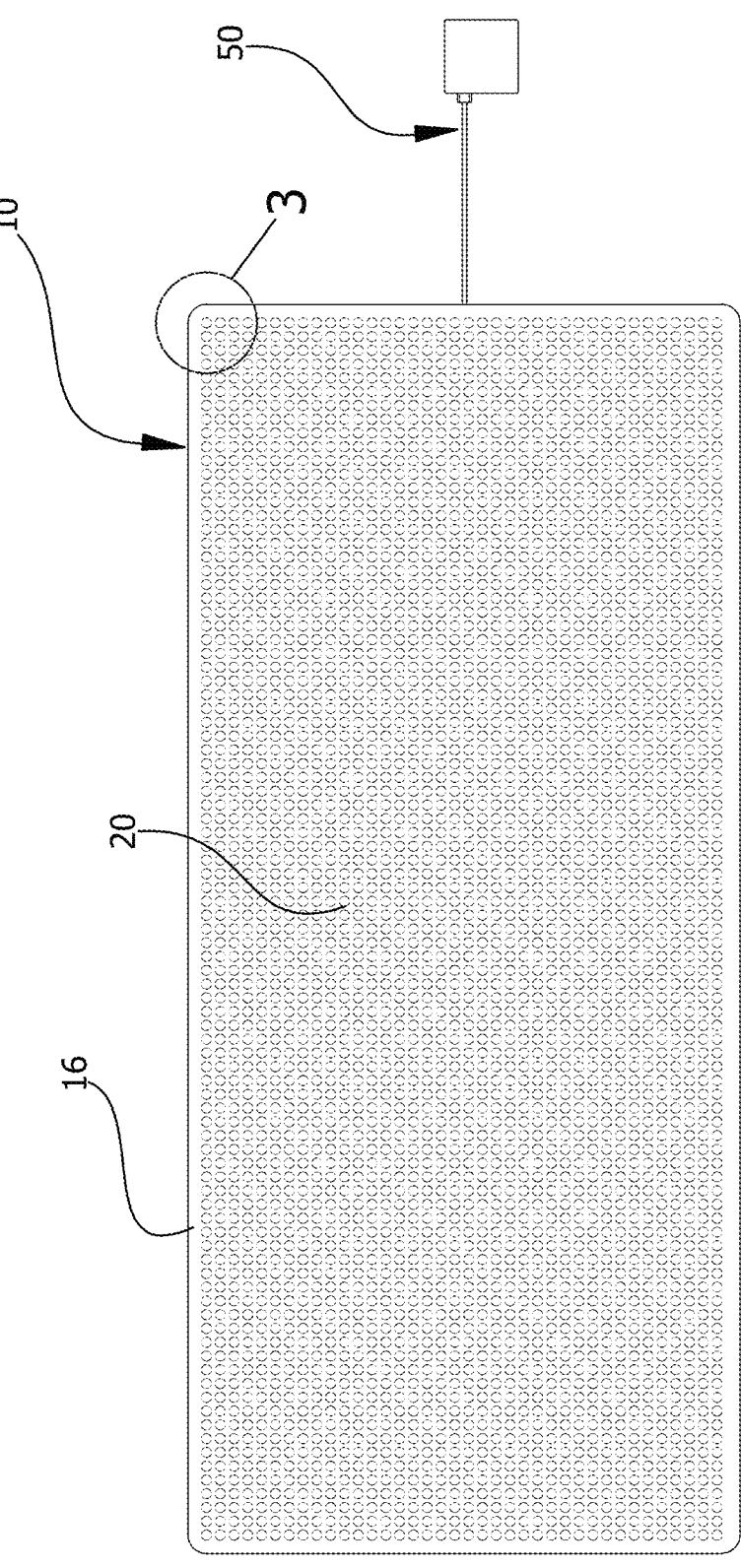
FIG. 2 is a top view of an embodiment of the disclosure.
Figure 3:
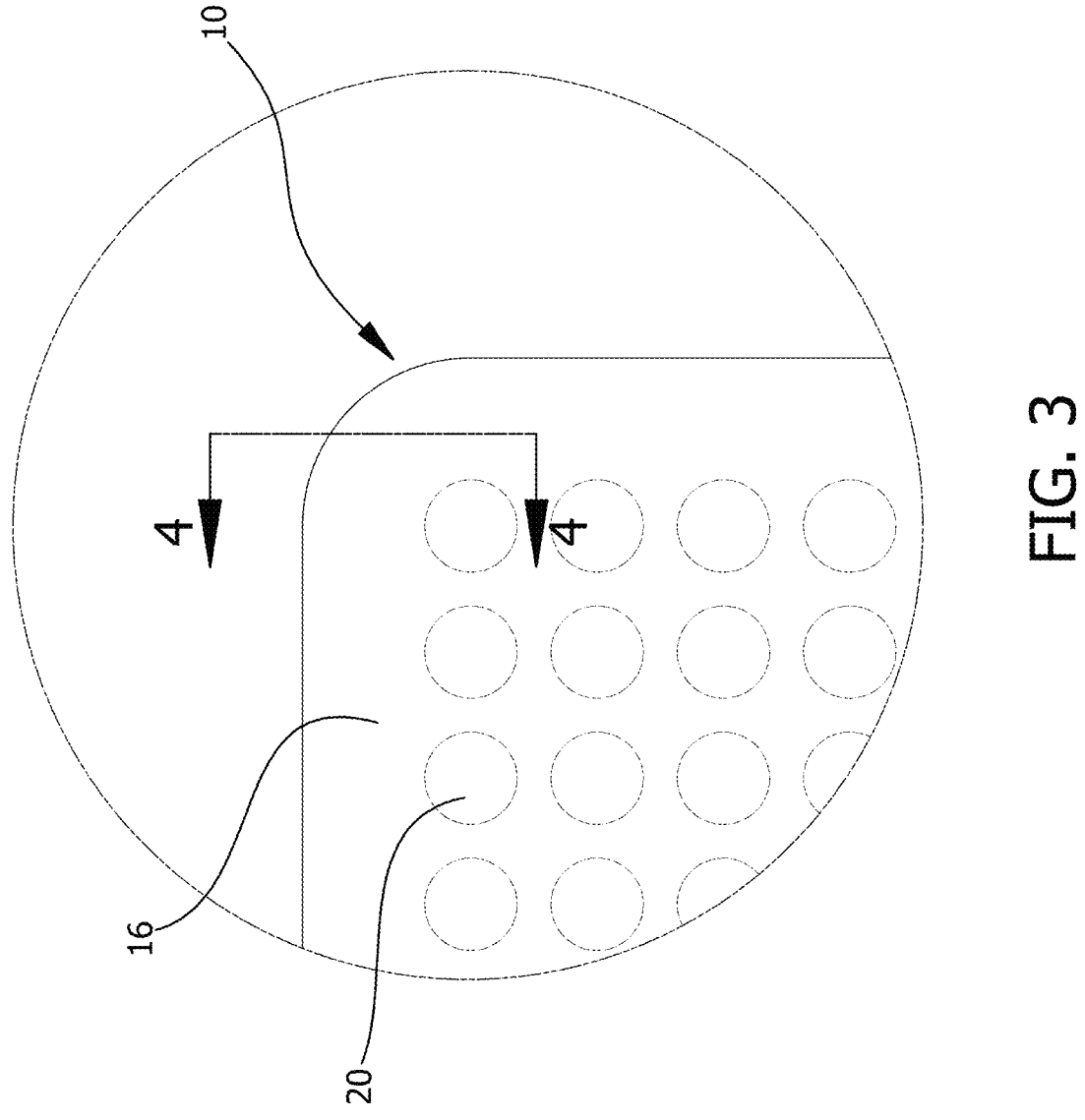
FIG. 3 is a close-up view of a portion of an embodiment of the disclosure.
Figure 4:
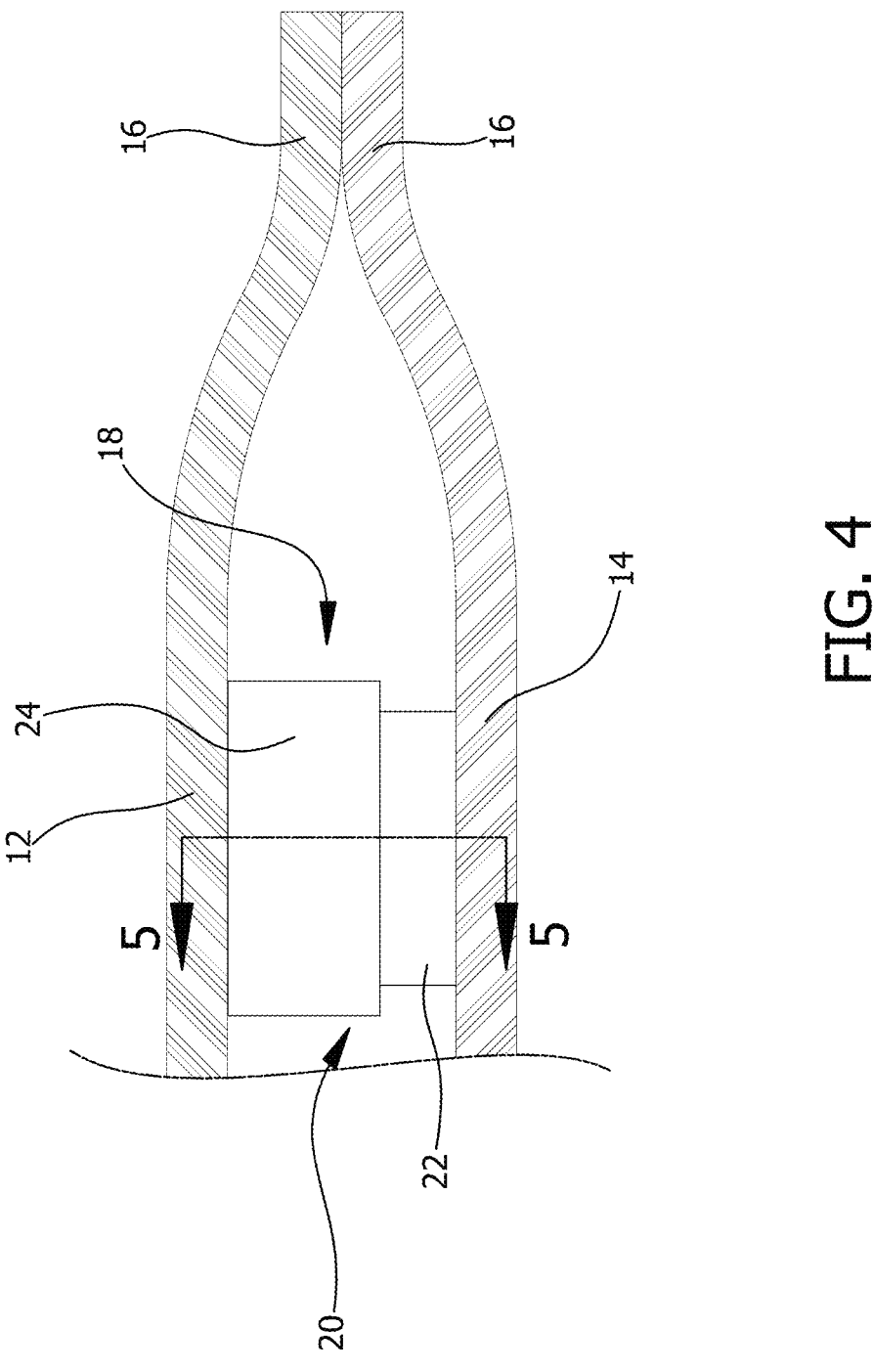
FIG. 4 is a cross-sectional view of a portion of an embodiment of the disclosure.
Figure 5:
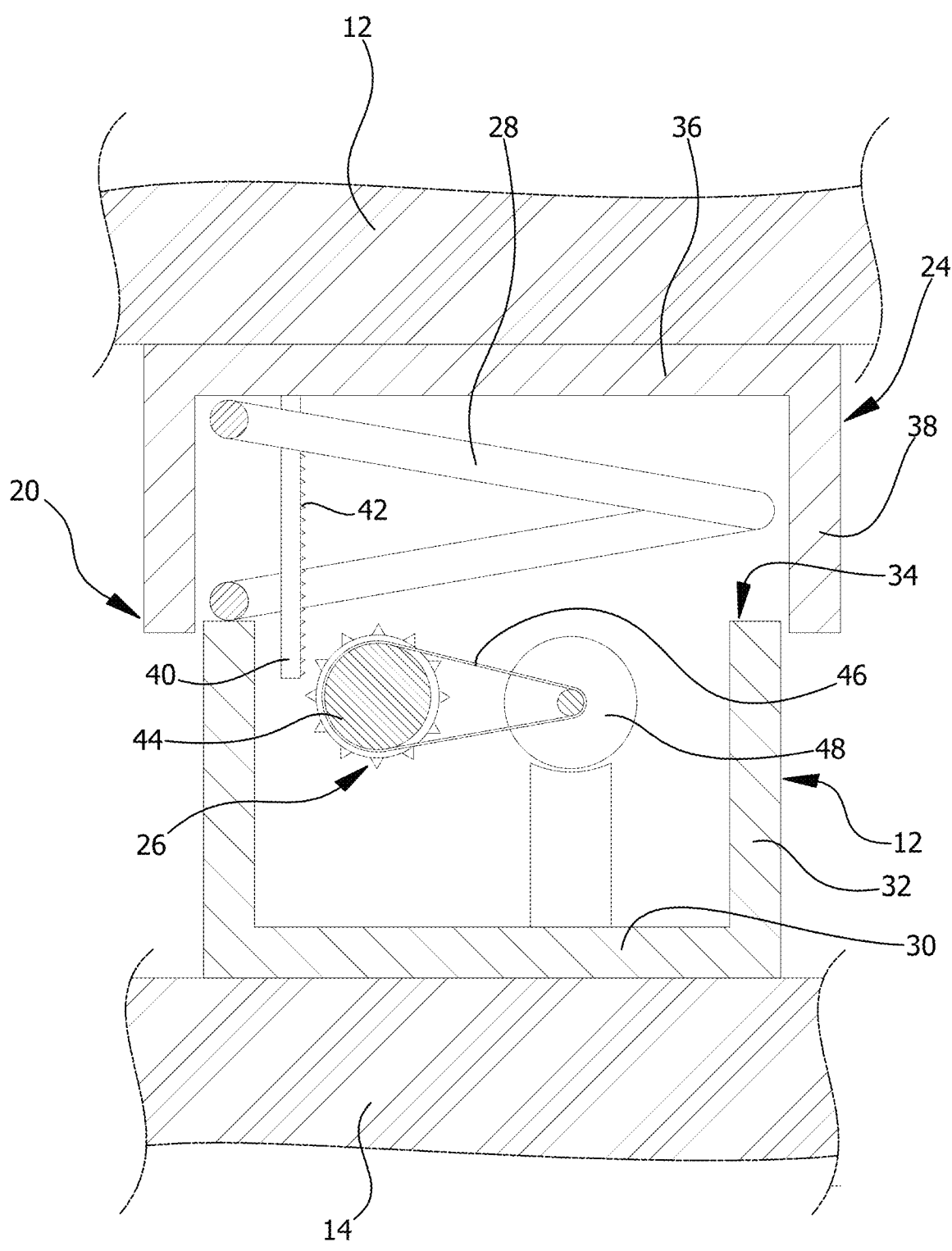
FIG. 5 is a cross-sectional view of the portion of the embodiment of the disclosure shown in FIG. 4.
Figure 6:
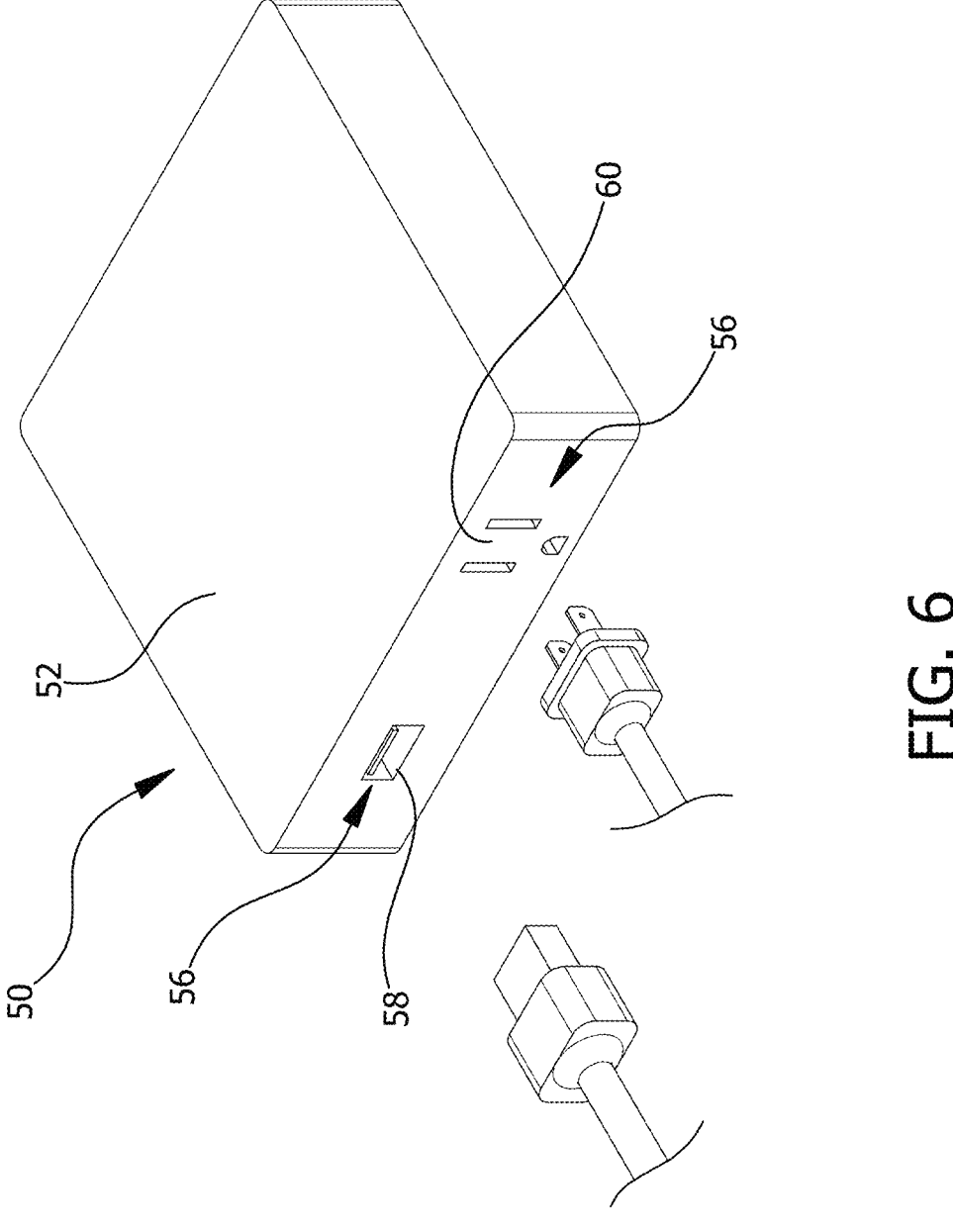
FIG. 6 is a perspective view of a component of an embodiment of the disclosure.

The microgenerators 20 are arranged in an array. As shown in the exemplary embodiment in FIG. 2, the array includes columns and rows in a rectangular layout extending across the interior space 18. However, in another possible embodiment, the microgenerators 20 are arranged in a different pattern, such as offset rows or offset columns, or possibly a circular pattern, or possibly an irregular pattern that is a mixture of different positions. In the exemplary embodiment, the microgenerators 20 are spaced less than one inch apart. However, in another possible embodiment, the microgenerators 20 are spaced more than one inch apart. In another possible embodiment, the microgenerators 20 are spaced further apart in a length direction of the energy-generating workout mat 10 and closer together in a width direction, as viewed from above, such as shown in FIG. 2.

The battery 50 includes a housing 52, an electrical cable 54 connected to the wiring, and an electrical receptacle 56 positioned in an exterior surface of the housing 52. Any type of electrical receptacle 56 could be included, such as an electrical receptacle 56 designed to connect to a universal serial bus (USB) cable, or a two-prong cable, or a three-prong cable, as are well known in the electrical arts. In the exemplary embodiment in FIG. 6, a first electrical receptacle 58 is positioned in an exterior surface of the housing 52. The first electrical receptacle 58 is designed to connect to a universal serial bus cable. A second electrical receptacle 60 is also positioned in the exterior surface of the housing 52. The second electrical receptacle 60 is designed to connect to either a two- or three-pronged cable.

The top layer 12 and the bottom layer 14 can be made of different types of material in different combinations. For example, the top layer 12, as mentioned above, is made of flexible material. The flexible material could be cloth or fabric made of natural or synthetic fibers, or possibly plastic. The flexible material could also be a resilient material, such as elastic, foam, memory foam, or rubber, in order to provide cushioning. The bottom layer 14 could also be made of such flexible and/or resilient material. The bottom layer 14 could also be made of an inflexible material to provide a firm backing for the microgenerators 20. In another possible embodiment, the top layer 12 and/or bottom layer 14 could be made of a combination of materials, such as a foam material covered by a plastic layer.

Figure 7:
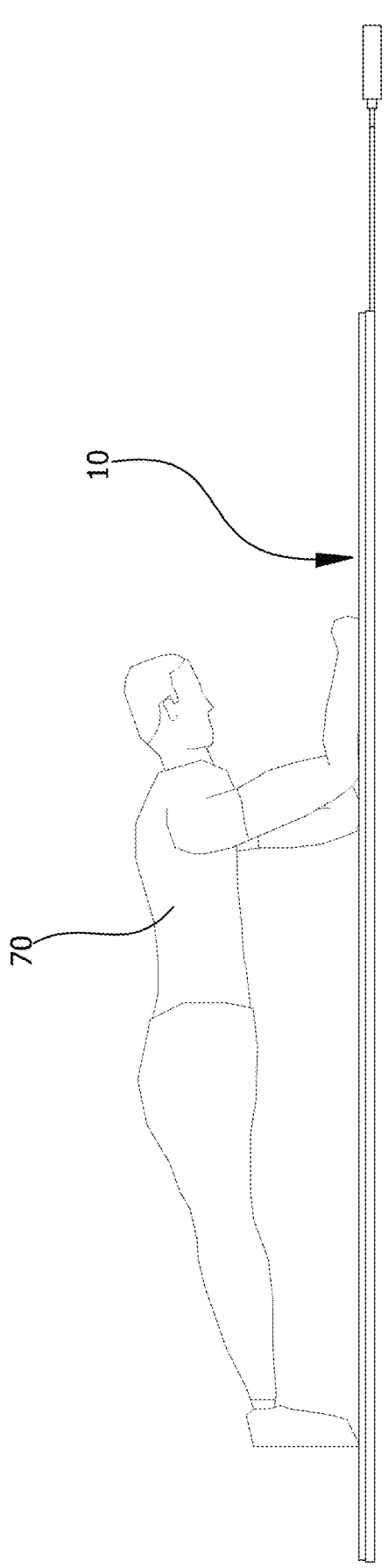
FIG. 7 is a side view of an embodiment of the disclosure in use.

FIG. 7 shows the energy-generating workout mat 10 in use, wherein a person 70 is exercising on the mat, such as by performing stretches or yoga, or by doing cardiovascular-stimulating exercises, such as steps or jumps. The more the person 70 moves around on the energy-generating workout mat 10, the greater frequency of activation of individual microgenerators 20 to generate electricity for storage in the battery 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An energy-generating workout mat comprising:
a top layer, said top layer being made of flexible material;
a bottom layer being attached to said top layer, wherein said top layer and said bottom layer are attached at respective perimeter portions such that said top layer and said bottom layer enclose an interior space;
a plurality of microgenerators being disposed in said interior space between said top layer and said bottom layer, each of said microgenerators being configured to be activated by a pressing force of a person exercising on said top layer to generate electrical energy, said microgenerators being coupled together by wiring; and
a battery being connected to said microgenerators by said wiring to receive and store the electrical energy; and
wherein each of said microgenerators includes:
a base;
a generator assembly disposed in said base; and
a head movably supported on said base by a spring and connected to said generator assembly, wherein said head is configured to engage and actuate said generator assembly when said head is depressed against said spring by the pressing force of a person on said top layer and released.

2. The energy-generating workout mat of claim 1, wherein:
said base includes a bottom wall and a perimeter wall extending perpendicularly from said bottom wall, said perimeter wall having an upper edge;
said head includes a top wall and a perimeter wall extending perpendicularly from said top wall;
said head includes a projection configured to engage said generator assembly; and
said top wall of said head abuts said upper edge of said perimeter wall of said base when said head is depressed such that only said projection contacts said generator assembly.

3. The energy-generating workout mat of claim 2, wherein said perimeter wall of said head has a larger diameter than said perimeter wall of said base such that said head is movable with respect to said base in a telescoping manner.

4. The energy-generating workout mat of claim 1, wherein said microgenerators are arranged in an array.

5. The energy-generating workout mat of claim 4, wherein said array includes columns and rows in a rectangular layout extending across said interior space.

6. The energy-generating workout mat of claim 1, wherein said microgenerators are spaced less than one inch apart.

7. The energy-generating workout mat of claim 1, wherein said battery includes:

a housing;

an electrical cable connected to said wiring; and an electrical receptacle disposed in an exterior surface of said housing.

8. The energy-generating workout mat of claim 7, wherein said electrical receptacle is configured to connect to a universal serial bus cable.

9. The energy-generating workout mat of claim 7, wherein said electrical receptacle is configured to connect to a two-prong cable.

10. The energy-generating workout mat of claim 7, wherein said electrical receptacle is configured to connect to a three-prong cable.

11. The energy-generating workout mat of claim 7, wherein said flexible material of said bottom layer is a resilient material.

12. The energy-generating workout mat of claim 1, wherein said battery includes:

a housing;

an electrical cable connected to said wiring;

a first electrical receptacle disposed in an exterior surface of said housing, said first electrical receptacle is configured to connect to a universal serial bus cable; and a second electrical receptacle disposed in the exterior surface of said housing, said second electrical receptacle is configured to connect to a pronged cable.

13. The energy-generating workout mat of claim 1, wherein said flexible material of said top layer is a resilient material.

14. The energy-generating workout mat of claim 1, wherein said bottom layer is made of a flexible material.

15. The energy-generating workout mat of claim 1, wherein:

said base includes a bottom wall and a perimeter wall extending perpendicularly from said bottom wall, said perimeter wall having an upper edge;

said head includes a top wall and a perimeter wall extending perpendicularly from said top wall;

said head includes a projection configured to engage said generator assembly;

said top wall of said head abuts said upper edge of said perimeter wall of said base when said head is depressed such that only said projection contacts said generator assembly;

said perimeter wall of said head has a larger diameter than said perimeter wall of said base such that said head is movable with respect to said base in a telescoping manner;

said microgenerators are arranged in an array, which said array includes columns and rows in a rectangular layout extending across said interior space;

said microgenerators are spaced less than one inch apart;

said battery includes:

a housing;

an electrical cable connected to said wiring;

a first electrical receptacle disposed in an exterior surface of said housing, said first electrical receptacle is configured to connect to a universal serial bus cable; and a second electrical receptacle disposed in the exterior surface of said housing, said second electrical receptacle is configured to connect to a pronged cable;

said flexible material of said top layer is a resilient material;

said bottom layer is made of a flexible material; and said flexible material of said bottom layer is a resilient material.

\* \* \* \* \*